W. O. STODDARD, Jr.
IMITATION LEATHER.
APPLICATION FILED JAN. 13, 1917.
1,262,133.
Patented Apr. 9, 1918.
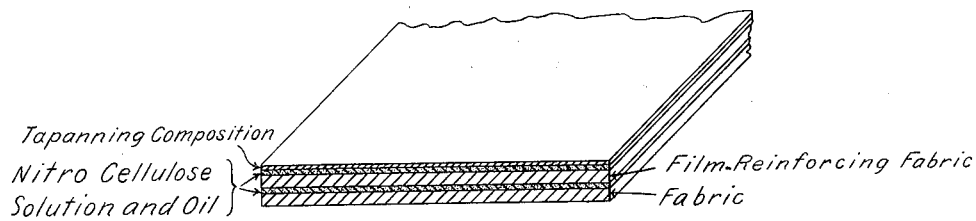

UNITED STATES PATENT OFFICE.

WILLIAM O. STODDARD, JR., OF MADISON, NEW JERSEY, ASSIGNOR, BY DIRECT AND MESNE ASSIGNMENTS, TO THE DURATEX COMPANY, OF NEWARK, NEW JERSEY, A CORPORATION OF NEW JERSEY.

IMITATION LEATHER.

1,262,133.  Specification of Letters Patent.  Patented Apr. 9, 1918.

Application filed January 13, 1917. Serial No. 142,316.

*To all whom it may concern:*

Be it known that I, WILLIAM O. STODDARD, Jr., a citizen of the United States, residing at Madison, in the county of Morris and State of New Jersey, have invented certain new and useful Improvements in Imitation Leather, of which the following is a specification.

My invention relates to a material intended for use as an imitation leather or as a substitute for leather, and to the method of making such material. The object of the present invention is the production of a material intended more particularly for automobile and other upholstery purposes, carriage and automobile tops, shoes and other uses to which a flexible leather is adapted and to reproduce on a textile the appearance of the well known so called "patent leather", and other effects produced on leather by a japanning process.

Generally stated, the product consists of a suitable fabric base having a composition film thereon; a reinforcing material embedded in said film, and a superimposed baked coating of a japanning composition, as shown diagrammatically in the accompanying drawing. The method of making the product consists in coating a fabric with a composition containing a nitro-cellulose solution and a vegetable oil; embedding in the film so formed a material for reinforcing the film, and then spreading upon the surface of the film a japanning composition and subjecting the fabric to a baking temperature.

The following is a description of the manner in which I prefer at present to carry out my invention. Upon any suitable material as a base, such as linen, cotton, drill, moleskin, sateen or other fabric, I spread a composition consisting essentially of a nitro-cellulose solution and an oil. I prefer a composition consisting of one pound of nitrated cotton and one and one-half pounds of blown castor oil or blown rape seed oil. The nitrated cotton may be dissolved in any suitable solvent such as amyl acetate, and the oil added thereto and the mixture thoroughly stirred. This composition may be spread cold upon the base, the latter being mounted upon a suitable frame having rollers around which it is run in the form of a continuous belt at any desired speed. It may be applied by any suitable means as a brush, or from a nozzle in front of a doctor blade extending the width of the fabric. As the fabric travels around the rollers the nitro-cellulose coat is more or less dried by the evaporation of the solvent and, if desired, artificial heat may be used. When required a second coat may be applied, preferably in the proportions of one pound of nitrated cotton to five pounds of blown castor oil or blown rape seed oil.

Upon the base so prepared, whether with one, two or more coats of the composition I lay, by means of suitable apparatus, a fabric such as sheeting, cheese cloth, mohair or threads of any kind or nature, and upon this fabric, or threads, I spread a coat of a nitro-cellulose solution and an oil, preferably one pound of nitrated cotton in solution to one and one-half pounds of blown castor oil or blown rape seed oil. The consistency of this last coat is such that it will penetrate the superimposed fabric or threads and amalgamate with the underlying nitro-cellulose coat thus embedding the super-imposed fabric or threads in the nitro-cellulose coat, that is, the two or more nitro-cellulose coats amalgamate to form a film below the surface of which, and embedded therein, is the layer of sheeting, cheese cloth, mohair, threads or similar material. Thus the surface coat of nitro-cellulose will be reinforced by the interlacing threads of the super-imposed material. The fabric so treated may have applied thereto additional coats of nitro-cellulose solution and oil according to the special purpose for which the material is required.

According to the present invention the fabric is further treated by spreading thereon what is known in the art as a japanning composition consisting preferably of a vegetable oil, a mineral solvent and a coloring matter. For such composition I have used boiled linseed oil, naphtha and an opaque pigment. The fabric may be run around rollers mounted in a suitable frame to facilitate the application of the japanning composition thereto. This application may be made by means of brushes in a manner well known in the making of japanned or so-called patent leather. One or more coats of the japanning composition may be applied, the fabric being run into a large chamber after the application of each coat where it is subjected to a dry heat of the usual japanning temperature of about 150 F. to 180 F. in order to thoroughly bake and unite the japanning coat with the under-lying nitrated cotton coats. During the baking operation the heat softens the nitrated cotton coat and there is effected a firm union between the nitrated cotton and japanning coats. Two or more applications of the japanning composition may be made, the surface of the material being stoned in the usual way between the baking operations. The union between the nitro-cellulose film and the japanned coat is sufficiently firm to prevent separation when subjected to the dye press for the purpose of embossing, should the material be subjected to such operation.

The finished product is well adapted for upholstery work and for shoes, and will stand the continual bending and creasing to which a shoe is subjected in daily wear without wearing through or breaking the surface.

Believing myself to be the first to coat a fabric and to embed a second fabric within the coating film for the purpose of reinforcing the film, and having a super-imposed finishing coat of a japanning composition baked thereon, I desire to claim the same broadly without reference to the precise composition described.

What I claim and desire to secure by Letters Patent of the United States is:—

1. An article of manufacture consisting of a textile fabric coated with a solution of nitro-cellulose forming a film thereon, a material embedded in such film to reinforce the same, and a super-imposed baked coating of a japanning composition.

2. An article of manufacture consisting of a textile fabric coated with a solution of nitro-cellulose and an oil forming a film thereon, a material embedded in such film to reinforce the same, and a super-imposed baked coating of a japanning composition.

3. An article of manufacture consisting of a textile fabric coated with a solution of nitro-cellulose and a blown vegetable oil forming a film thereon, a material embedded in such film to reinforce the same, and a super-imposed baked coating of a japanning composition.

4. An article of manufacture consisting of a textile fabric coated with a solution of nitro-cellulose and castor oil forming a film thereon, a material embedded in such film to reinforce the same, and a super-imposed baked coating of a japanning composition.

In testimony whereof I have hereunto signed my name in the presence of two subscribing witnesses.

WILLIAM O. STODDARD, Jr.

Witnesses:
CHARLES S. JONES,
PAUL H. FRANKE.